US009892175B2

(12) United States Patent
Couris et al.

(10) Patent No.: US 9,892,175 B2
(45) Date of Patent: *Feb. 13, 2018

(54) DATA SET PREVIEW TECHNOLOGY

(71) Applicant: Microsoft Technology Licensing, LLC, Redmond, WA (US)

(72) Inventors: Cheryl Couris, Seattle, WA (US); Jason Walken Falk, Seattle, WA (US); Drew Voegele, Kirkland, WA (US); Jean-Sebastien Brunner, Seattle, WA (US); Konstantin Zoryn, Redmond, WA (US); Roman Kogan, Kirkland, WA (US); Francesco Lunetta, Bellevue, WA (US); Shankar Gopalakrishnan, Issaquah, WA (US); Miguel Llopis, Issaquah, WA (US); Shankar Regunathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,903

(22) Filed: Jun. 19, 2017

(65) Prior Publication Data

US 2017/0286501 A1 Oct. 5, 2017

Related U.S. Application Data

(63) Continuation of application No. 14/314,991, filed on Jun. 25, 2014, now Pat. No. 9,710,526.

(51) Int. Cl.
*G06F 3/048* (2013.01)
*G06F 17/30* (2006.01)

(52) U.S. Cl.
CPC .. *G06F 17/30554* (2013.01); *G06F 17/30867* (2013.01)

(58) Field of Classification Search
CPC .. G06F 17/212; G06F 3/04817; G06F 3/0482; G06F 17/30112
(Continued)

(56) References Cited

U.S. PATENT DOCUMENTS 6,012,053 A 1/2000 Pant et al.
6,314,397 B1 11/2001 Lewis et al.
(Continued)

FOREIGN PATENT DOCUMENTS

EP 2669813 12/2013

OTHER PUBLICATIONS

"Non-Final Office Action Issued in U.S. Appl. No. 14/314,991", dated Dec. 29, 2016, 8 Pages.
(Continued)

*Primary Examiner* — David Phantana Angkool
(74) *Attorney, Agent, or Firm* — Workman Nydegger

(57) ABSTRACT

A mechanism for providing a preview of a data set. The search system finds a data set relevant to the search query. For any given data set, the search system extracts only a sample of elements from the data set. The sample of elements provided to the requestor includes elements for which there is a match on the search query, and elements that have no hit, but are proximate to an element that has a hit. The user obtains a view constructed of the sample of elements provided by the search system. The user is also provided with navigation controls that correspond to the most search-relevant portions of the view. Controls associated with those portion(s) may then be selected to thereby move the preview of the data set so that the portion or corresponding hit for that portion is in view.

29 Claims, 13 Drawing Sheets

(58) Field of Classification Search
USPC .......................................................... 715/856
See application file for complete search history.

(56) References Cited

U.S. PATENT DOCUMENTS

| | | | |
|---|---|---|---|
| 6,442,576 | B1 | 8/2002 | Edelman et al. |
| 6,785,417 | B1 | 8/2004 | Williamson et al. |
| 7,102,765 | B1 | 9/2006 | Abi-Saleh et al. |
| 7,788,085 | B2 | 8/2010 | Brun et al. |
| 7,831,423 | B2 | 11/2010 | Schubert |
| 8,145,617 | B1 | 3/2012 | Verstak et al. |
| 8,205,149 | B2 | 6/2012 | Chan et al. |
| 8,452,723 | B2 | 5/2013 | Belyy et al. |
| 8,810,595 | B2 | 8/2014 | Holm-Peterson et al. |
| 9,146,954 | B1 | 9/2015 | Boe et al. |
| 9,423,924 | B2 | 8/2016 | Jeon et al. |
| 9,547,626 | B2 | 1/2017 | De Voogd |
| 9,596,188 | B2 | 3/2017 | Cheng et al. |
| 9,645,668 | B2* | 5/2017 | Yeo ........................ G06F 3/0416 |
| 9,710,526 | B2* | 7/2017 | Couris ............... G06F 17/30554 |
| 9,773,270 | B2* | 9/2017 | Costa ................. G06Q 30/0631 |
| 2005/0057566 | A1 | 3/2005 | Githens et al. |
| 2007/0061307 | A1 | 3/2007 | Hartwell et al. |
| 2008/0018917 | A1 | 1/2008 | Zhang |
| 2008/0263443 | A1 | 10/2008 | Maxime |
| 2009/0150353 | A1 | 6/2009 | Laakso et al. |
| 2009/0201316 | A1* | 8/2009 | Bhatt ..................... G06F 9/4443 345/660 |
| 2010/0146012 | A1 | 6/2010 | Beaudreau et al. |
| 2012/0084644 | A1* | 4/2012 | Robert ................... G06F 9/4443 715/255 |
| 2013/0055197 | A1* | 2/2013 | Balan ........................ G06F 8/30 717/105 |
| 2013/0080935 | A1* | 3/2013 | Reeves ................. G06F 3/1438 715/761 |
| 2013/0159923 | A1 | 6/2013 | French et al. |
| 2013/0262986 | A1* | 10/2013 | Leblond .............. G06F 17/3089 715/236 |
| 2013/0275422 | A1* | 10/2013 | Silber ............... G06F 17/30864 707/728 |
| 2014/0033029 | A1 | 1/2014 | Pittenger et al. |
| 2014/0056522 | A1* | 2/2014 | Kim ......................... G06K 9/18 382/182 |
| 2014/0071323 | A1* | 3/2014 | Yi ....................... G06F 3/04883 348/333.01 |
| 2014/0304651 | A1* | 10/2014 | Johansson ............. G06F 3/0482 715/810 |
| 2015/0317354 | A1 | 11/2015 | Andress et al. |
| 2015/0379093 | A1 | 12/2015 | Couris et al. |
| 2016/0026321 | A1* | 1/2016 | Yeo ........................ G06F 3/0416 345/173 |
| 2016/0196347 | A1 | 7/2016 | Cheung et al. |
| 2016/0259528 | A1* | 9/2016 | Foss ....................... G06F 3/0482 |

OTHER PUBLICATIONS

"Notice of Allowance Issued in U.S. Appl. No. 14/314,991", dated Mar. 24, 2017, 6 Pages.

Ernsting, Case, "Google Instant Preview: The Visual Aspect of SEO", Retrieved From: <<http://www.searchenginejournal.com/google-instant-preview-the-visual-aspect-of-seo/25935/>>, Dec. 1, 2010, 10 Pages.

Office Action dated Mar. 23, 2017 cited in U.S. Appl. No. 14/589,822.

"International Search Report and the Written Opinion Issued in PCT Application No. PCT/US2016/012096", dated Mar. 24, 2016, 11 pages.

"Advanced Find & Replace for Microsoft Excel 2013-2003", Published on: Feb. 17, 2013. Available at: https://www.ablebits.com/excel-find-replace/.

"Microsoft Word Macro VBA Replace Text with Image in Document Header", Published on: Sep. 29, 2014. Available at: http://stackoverflow.com/questions/20552141/microsoft-word-macro-vba-replace-text-with-image-in-document-header.

"Find Specific Text and Replace with Image file in MS Word", Retrieved on: Oct. 6, 2014. Available at: http://stackoverflow.com/questions/16456792/find-specific-text-and-replace-with-image-file-in-ms-word.

"Outlook Find and Replace", Published on: Sep. 20, 2013. Available at: http://www/lbetoolbox.com/outlook-find-replace/.

Macej, Peter, "Multiline Search and Replace in Visual Studio (2013-2005)", Publishe don: Mar. 3, 2014. Available at: http://www.helixoft.com/blog/multiline-search-and-replace-in-visual-studio-2013-2005.html.

"Second Written Opinion Issued in PCT Application No. PCT/US2016/012096", dated Dec. 19, 2016, 7 Pages.

"International Preliminary Report on Patentability Issued in PCT Application No. PCT/US2016/012096", dated Apr. 3, 2017, 8 Pages.

* cited by examiner

Minimum wages by country – List of minimum wages by country

| | PPP (Int$) | Standard workweek (hours) | Hourly(US$) | Hourly(Int$) | Percent of GDP per capita |
|---|---|---|---|---|---|
| | 309 | 38 | 16.88 | 50.63 | 47.5% |
| | | 40 | | | |
| | 34 | 40 | 1.19 | 1.23 | 38.9% |
| | 30 | 48 | 1.58 | 2.09 | 49.2% |
| | 30 | 40 | 0.83 | 1.22 | 205.7% |
| | | 44 | 0.05 | 0.06 | 1.8% |
| | | 48 | | | |
| | 52 | 40 | 2.58 | 3.29 | 25.8% |
| | 23 | 48 | 0.45 | 0.32 | 154.2% |

Columns [10]
Country ▾, Minimum wage ▾, Annual (US$), Annual PPP (Int$), Standard workweek, Hourly,
Percent of GDP per capita, Effective, Key Data Sources [1]

Online Search

Percent GDP China and Nepal [✗] All ▸

606 results

Asia – World distribution of...

Minimum wages by countr...

Comparison of China's hist...

As a percentage of GDP – l...

*Figure 13*

DATA SET PREVIEW TECHNOLOGY

CROSS-REFERENCE TO RELATED APPLICATIONS

This application is a continuation of U.S. patent application Ser. No. 14/314,991 filed on Jun. 25, 2014, entitled "DATA SET PREVIEW TECHNOLOGY," and which application is expressly incorporated herein by reference in its entirety.

BACKGROUND

Computing systems have revolutionized the way people communicate, do business, and play, and has enabled what is now termed the "information age". The Internet may be used to access a wide volume of information, and databases are likewise infused with large quantities of data. Current search engines might have access to literally millions of data sets.

However, any given human or entity is not often interested in (or even capable of comprehending) all of the available information at any given time. Accordingly, the user might search for data sets that are most relevant to the user. Given the high availability of numerous data sets, the internal complexity of data sets, the difficulty in expressing search queries and interpreting search results, and the nuances of human expression and interpretation, the search engine might not be entirely aware of which data set will most precisely meet the needs of the user. The search engine can, however, perform an initial filtering of the data sets to return those data sets that it predicts are more likely than others of meeting the needs of the user given the search query. Nevertheless, even with all of the advanced technology available, it is still the user that is endowed with the capability to most clearly understand which data sets will most clearly meet there needs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein related to a mechanism for providing a preview of a data set to a user. A user submits a search request to a search system that finds a data set that is relevant to the search query. In some embodiments, the search system might have access to innumerable data sets, and find multiple candidate data sets that it anticipates might be relevant to the search query. For any given data set, the search system extracts only a sample of elements from the data set. For instance, if the data set were a table, the elements might be rows, columns, or cells in the table. The sample of elements includes both elements for which there is a match on the search query, as well as elements that have no hit, but are proximate to at least one of the elements that has a hit. Such proximate elements may provide context whereby the user might infer data quality (such as scarcity and density). The sample of elements may then be provided to the requestor corresponding to the search query.

From the user's perspective, the user obtains a view or preview of a data set that matches the search query. For instance, the view may be constructed of the sample of elements provided by the search system. Perhaps the view is displayed in response to user selection of the data set, where the data set is perhaps just one of many data sets that are matches to the search query. The user is also provided with navigation aids that correspond to the most search-relevant portions of the view. For instance, in one embodiment, the user system visually emphasizes each of one or more portions of the data set that contain one or more hits for each of at least one of the one or more search terms. Controls associated with those portion(s) may then be selected to thereby move the preview of the data set so that the corresponding hit for that portion is in view. In another embodiment, the user system identifies portion(s) of the data set which are identified by at least one of the one or more search terms, and then provides controls corresponding to each identified portion(s) such that selection of the control moves the preview of the data set so that at least a portion of the identified portion of the data set is in view.

Thus, the user may quickly and intuitively evaluate candidate data sets that result from searches, to thereby quickly select the data set that is most relevant in their own judgment. This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10 illustrates a user interface that is similar to the user interface of FIG. 9, except that the user has interacted with the "China" element from the drop down list, causing the China row to automatically be pulled into the field of view of the preview;

FIG. 11 illustrates a user interface that is similar to the user interface of FIG. 10, except now again the user selects the "Country" drop down control for the purpose of selecting "Nepal";

FIG. 12 illustrates a user interface that results from the user selecting "Nepal" from the "Country" drop down control in FIG. 11; and FIG. 13 illustrates a user interface that results from the user selecting the "percent GDP per capita" control.

DETAILED DESCRIPTION

Figure 1:
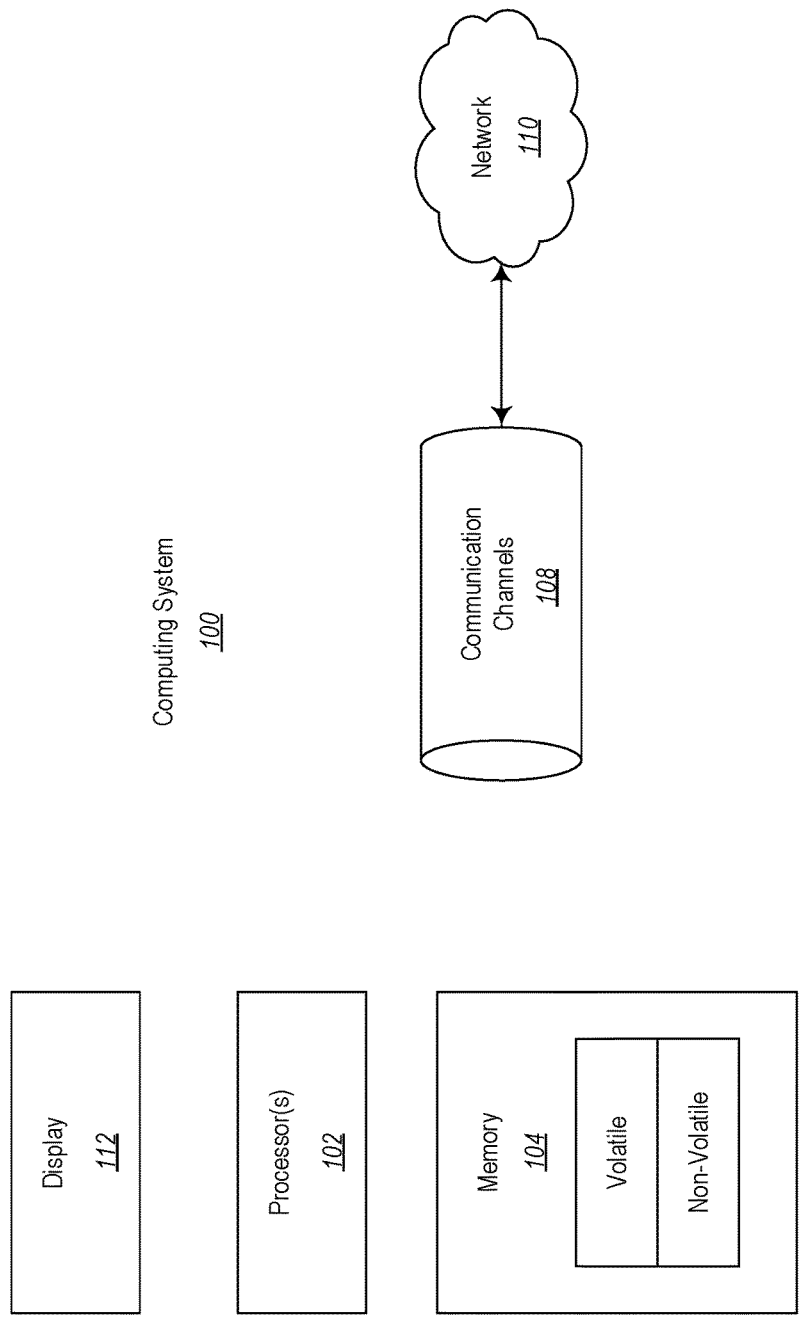
FIG. 1 illustrates an example computing system in which the principles described herein may be employed.

At least some embodiments described herein related to a mechanism for providing a preview of a data set to a user. A user submits a search request to a search system that finds a data set that is relevant to the search query. In some embodiments, the search system might have access to innumerable data sets, and find multiple candidate data sets that it determines might be relevant to the search query. For any given candidate data set, the search system extracts only a sample of elements from the data set. For instance, if the data set were a table, the elements might be rows, columns or cells in the table. The sample of elements includes both elements for which there is a match on the search query, as well as elements that have no hit, but are proximate to at least one of the elements that has a hit. Such proximate elements may provide context whereby the user might infer data quality (such as scarcity and density). The sample of elements may then be provided to the requestor corresponding to the search query.

From the user's perspective, the user obtains a view or preview of a data set that matches the search query. For instance, the view may be constructed of the sample of elements provided by the search system. Perhaps the view is displayed in response to user selection of the data set, where the data set is perhaps just one of many data sets that are matches to the search query. The user is also provided with navigation aids that correspond to the most search-relevant portions of the view. For instance, in one embodiment, the user system visually emphasizes each of one or more portions of the data set that contain one or more hits for each of at least one of the one or more search terms. Controls associated with those portion(s) may then be selected to thereby move the preview of the data set so that the corresponding hit for that portion is in view. In another embodiment, the user system identifies portion(s) of the data set which are identified by at least one of the one or more search terms, and then provides controls corresponding to each identified portion(s) such that selection of the control moves the preview of the data set so that at least a portion of the identified portion of the data set is in view.

Thus, the user may quickly and intuitively evaluate data sets that result from searches, to thereby quickly select the data set that is most relevant in their own judgment.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112 for displaying user interfaces such as those described herein.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
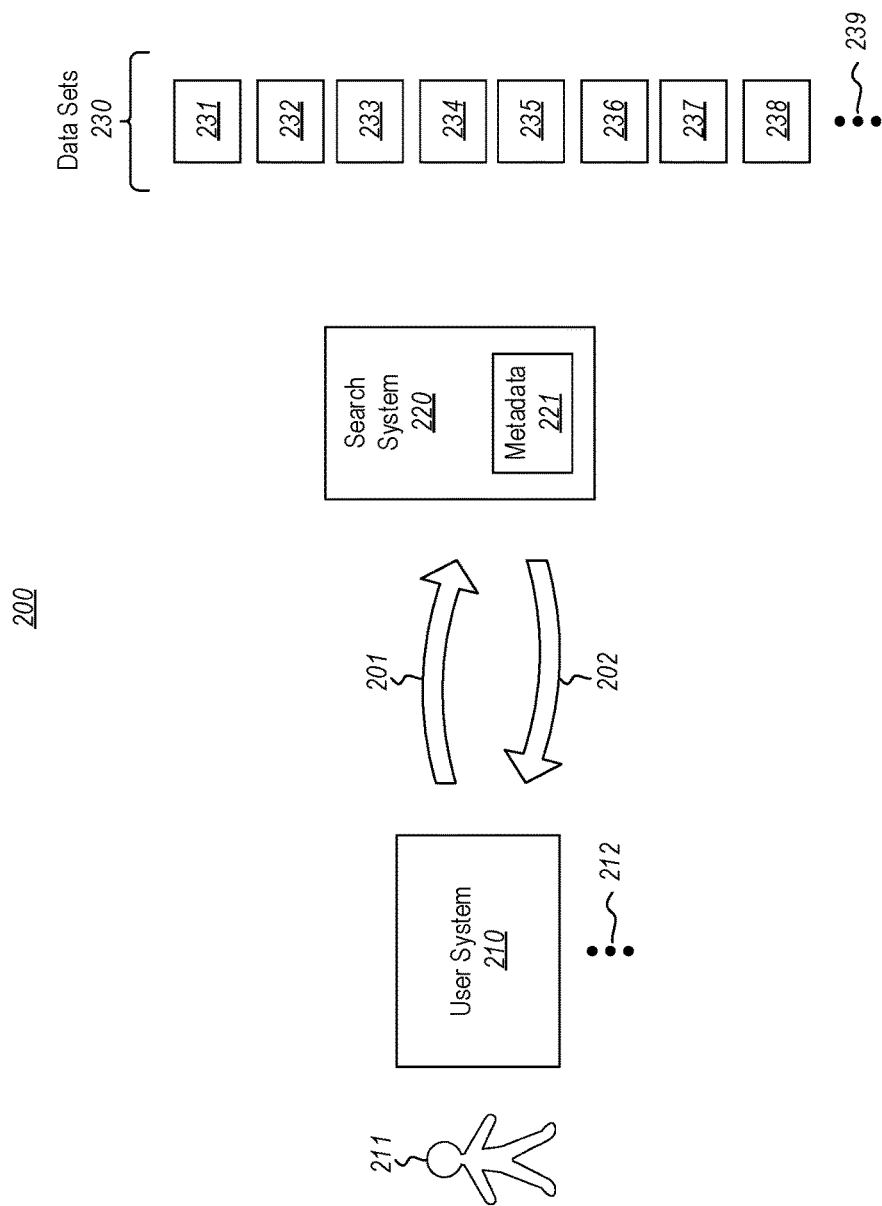
FIG. 2 illustrates an environment that includes a user system for interfacing with a user to submit search queries, and a search system for providing corresponding search results back to the user system.

FIG. 2 illustrates an environment 200 that includes a user system 210 for interfacing with a user 211 to submit search queries (as represented by arrow 201), and a search system 220 that receives the search queries and provides corresponding search results (as represented by arrow 202) back to the user system 210. The user system 210 may be structured as described for the computing system 100 of FIG. 1, with the caveat that computing systems in modern times may take almost any form, and the variety of form factors for operational computing systems is only anticipated to increase in the future. There is no limit to the form that the computing system 100 can take.

The search system 220 receives and interprets queries from the user system 210, as well as potentially many other user systems (as represented by the ellipses 212), has access to numerous data sets 230, and uses those data sets 230 to return search results to the user. In the illustrated embodiment, the data sets 230 include eight data sets 231 through 238, although the ellipses 239 symbolically represent the presence of many more such data sets. Some search systems have access to millions of data sets. In one embodiment, one or more of the data sets 230 may be dimensional data sets which constitute elements arrayed in two or more dimensions. For instance, a table is a two dimensional data set with cells arrayed in two dimensions, and larger elements being groups of elements (e.g., rows) arrayed sub-dimensionally (e.g., vertically) and larger elements being groups of elements (e.g., columns) arrayed sub-dimensionally (e.g., horizontally)

The search system 220 may be distributed. For instance, some or all of the search system might be integrated within the user system 210 itself, or within a local network of the user system 210, and have access to local data sets. If there is a local portion of the search system 220, that local portion might have data sets that have information that belong more specifically to the user or to an organization to which the user belongs. Alternatively or in addition, some of all of the search system 220 might be remotely located and serve multiple searchers from a wide variety of organizations. Such a remote portion of the search system 220 might have access to more public data sets.

Regardless, the principles described herein apply whether the search system 220 is local to the user 211, remotely located, or a combination thereof. Furthermore, the principles described herein apply whether the data sets 230 are local to the user 211, are remotely located, or combinations thereof. Also, the principles described herein apply whether the data sets 230 contain private information that is access restricted, information that is widely available, or combinations thereof. The search system 220 may be, for example, another instance of the computing system 100 of FIG. 1, though no display 112 would be typically used in back end services.

Figure 3:
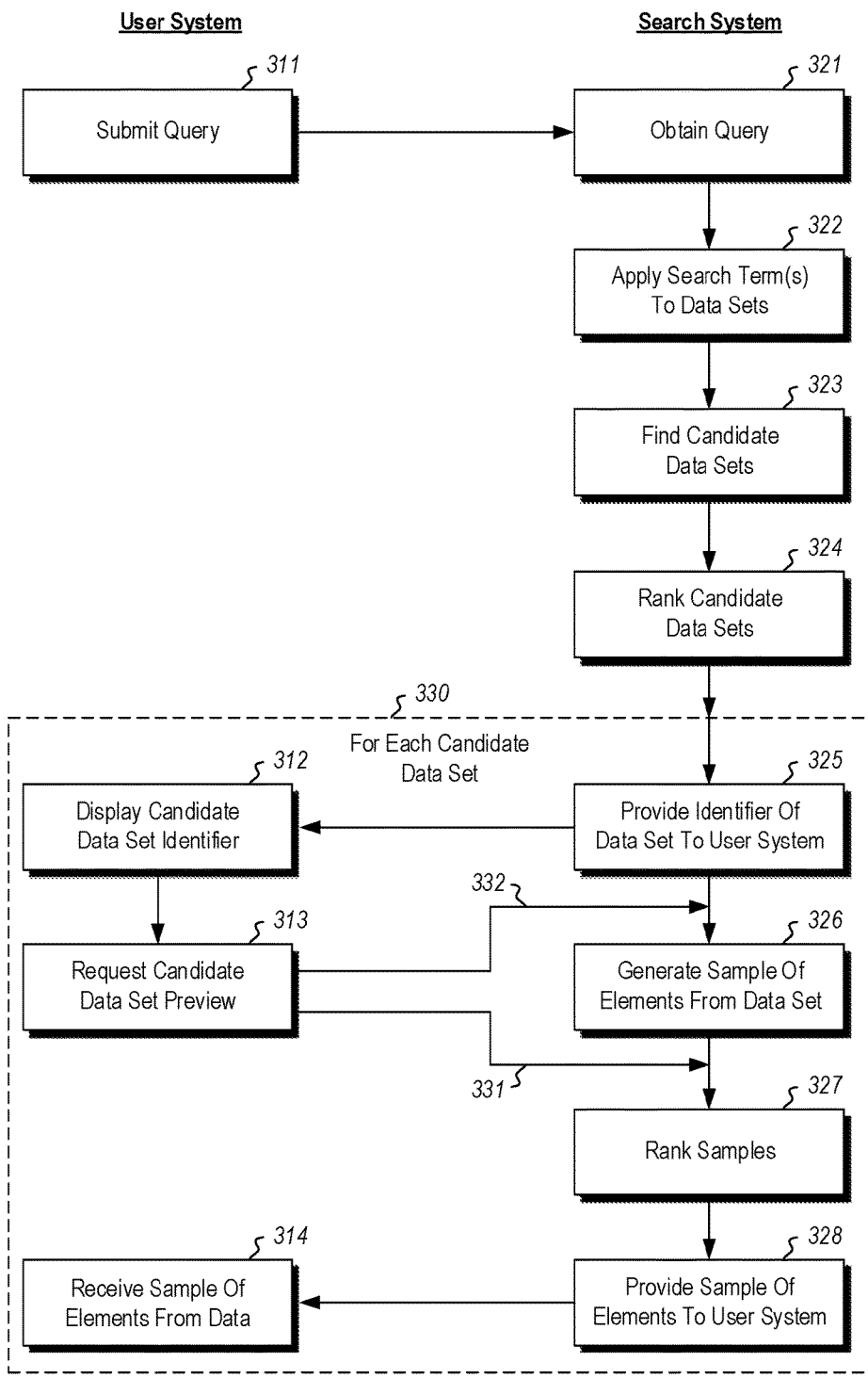
FIG. 3 illustrates a flowchart of a method for preparing for presentation of a navigable preview of a data set to a user.

FIG. 3 illustrates a flowchart of a method 300 for preparing for presentation of a navigable preview of a data set to a user. At the conclusion of the method 300, the user system has a sample of elements from a data set, which the user system may then use to construct the navigable preview of the data set. For instance, if the data set were a table (or any structure that may be interpreted to be a table), the sample of elements might be columns, or in the case of the examples described below, rows.

The method 300 permits the user to preview data sets in an intuitive way, without the user system having to download all of the data set that is to be previewed. Navigation controls are associated with different portions of a data set (e.g., different columns of a table), where the controls may be visually highlighted when the portion of the data set has a hit on one or more search terms and/or when the portion of the data set is identified (e.g., has a column title) that has one or more search terms therein. The user may interface with the navigation controls to expose those hits in the preview. Thus, the user may quickly see the relevance of the data set to the original search query. The view also shows surrounding elements, even if those surrounding elements do not have a hit, to thereby give the user a sense for the scarcity, quality, and relevance of the data.

Since the method 300 for facilitating presentation of a view of a data set to the user may be performed in the environment 200 of FIG. 2, the method 300 of FIG. 3 will now be described with respect to FIG. 2. That said, this is just for purposes of example. The method 300 may be performed in any search environment.

Some of the acts of the method 300 may be performed by the user system 210 as represented in the left column of FIG. 3, under the header "User System". Others of the acts of the method 300 may be performed by the search system 220 as represented in the right column of FIG. 3 under the header "Search System". That said, this is just an example, as many of the functions attributed as being performed by the user system 210 may be virtualized to be at another location, such as even in the search system 220, in the cloud, or at any other location.

Turning now to the method 300, the user first submits a query (act 311). For instance, in FIG. 2, the user system 210 generates a search query and submits the search query as represented by arrow 201. The search query might have been generated in response to the user 211 interacting with the user system 210. The search system then obtains the search query (act 321). For instance, in FIG. 2, the search system 220 receives the search query from the user system 210 as represented by the arrow 201.

The search system then applies the one or more search terms of the search query to a set of data sets (act 322), in order to thereby find candidate data set(s) that may satisfy the search query (act 323). The principles described herein are not limited to the mechanism for parsing the search query and applying the search terms against the data sets. As an example, in FIG. 2, the search system 220 analyzes the search query against data set metadata 221 to verify which of the data sets 230 might be most relevant to the search query. Of course, the search system 220 can only estimate what would be most useful or desired by the user 211. Accordingly, data sets that the search system 220 determines as meeting the search query are termed herein "candidate" data sets. The principles described herein allow the user to obtain an intuitively navigable preview of a candidate data set to allow users to judge for themselves whether a given data set meets the data quality and relevance desires of the user. The data sets results might then be ranked by estimated relevance and/or quality (act 324).

The contents of box 330 are then performed for each of the candidate data sets. For instance, the search system provides identification for the candidate data set to the requestor corresponding to the search query (act 325). For instance, in FIG. 2, the search system 220 provides identification of the candidate data sets to the user system 210. In an example that is to be followed hereinafter, suppose that the search system 220 identifies that data set 231, 234 and 236 are candidate data sets responsive to the search query. In real life, there may be thousands or millions of data sets accessible to the search system, and there may be identifications for tens, hundreds, or more resulting candidate data set provided back to the user system.

The user system may then display the identification for the candidate data set to the user (act 312). For instance, in FIG. 2, the user system 210 displays the identifications of the candidate data sets 231, 234 and 236 to the user 211. For a given candidate data set, the search system also extracts a sample of elements (act 326) from the candidate data set. The search system may also rank the resulting samples (act 327). The search system then provides the extracted sample of elements to the user system (act 328). The extracted sample of elements will assist in constructing a navigable preview of that candidate data set for purposes of assisting the user in deciding whether the candidate data set is useful. In the case of a dimensional data set, the sample of elements might be sub-dimensional elements that are arrayed along one or more dimensions for the dimensional data set in order to form the dimensional data set. As an example, for a table, the sample of sub-dimensional elements might be columns, rows or cells. If the data set were a three-dimensional table comprising a stack of two dimensional tables, the sample of sub-dimensional elements might be a two-dimensional slice of that table (e.g., one of the two dimensional tables, a row of all of the two dimensional tables, or a column of all of the two dimensional tables), a one-dimensional portion of that table (a column or a row), or a zero-dimensional portion of that table (e.g., cell).

For one or more and potentially all of the candidate data sets, the extraction the sample of elements (act 326), the ranking of the sample of elements (act 327) and the providing (act 328) that extracted sample to the user system may occur automatically without waiting for an explicit request from the user system. In FIG. 3, for instance, the extracted preview of the data set may be provided (act 328) to the user system at the same time as the identification of the data set is provided (act 325) to the user system. For instance, in the example of FIG. 2, for data set 231, the search system 220 might extract a sample of elements from the data set 231, and provide that sample of elements to the user system 210, and do so perhaps without waiting for the user 211 or user system 210 to request that preview, and perhaps do so at the same time and perhaps in the same communication as the identification of the candidate data sets is provided to the user system 210. In this scenario, there would be no need for act 313 (the explicit request for the data set preview).

Alternatively or in addition, for one or more and potentially all of the candidate data sets, the search system might extract the sample of elements, but delay providing the extracted sample of elements to the user system until an explicit request. For instance, in FIG. 3, the sample elements for one or more and potentially all of the candidate data sets may be extracted (act 326) automatically, but perhaps that extracted sample of elements is only provided (act 328) to the user system upon receipt (as represented by arrow 331) of an explicit request (act 313) from the user system. For instance, in the example of FIG. 2, for data set 234, the search system 220 might extract a sample of elements from the data set 234 (act 326) automatically without waiting for the user 211 or user system 210 to request that preview. Then, when the user system 210 requests the extracted sample of elements for that data set 234 (e.g., in response to a user selecting an identifier for the data set 234), the search system provides (act 328) that extracted sample of elements for that data set 234 to the user. Thus, in this scenario, extracting the sample of elements for the data set is not deferred, but the providing of the extracted sample of elements for the data set is deferred until an explicit user request.

Alternatively or in addition, for one or more and potentially all of the candidate data sets, the search system might delay even the extraction of the sample of elements to the user system until an explicit request. For instance, in FIG. 3, the sample elements for one or more and potentially all of the candidate data sets may be extracted (act 326) upon receipt (as represented by arrow 332) of an explicit request (act 313) from the user system. For instance, in the example of FIG. 2, for candidate data set 236, the search system 220 might extract a sample of elements (act 326) from the data set 236 in response to a requests from the user system 210 (e.g., in response to a user selecting an identifier for the data set 236). Then, the search system 220 provides (act 328) that extracted sample of elements for that data set 236 to the user. Thus, in this scenario, both the extracting and the providing of the sample of elements for the candidate data set is deferred until an explicit user request.

Figure 4:
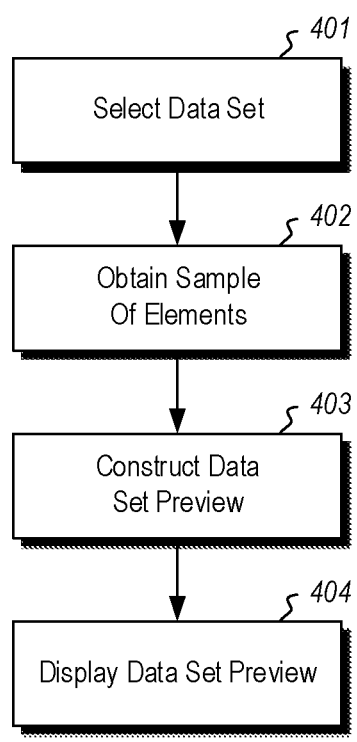
FIG. 4 illustrates a flowchart of a method for the user system to present a navigable preview to the user.

FIG. 4 illustrates a flowchart of a method 400 for the user system to present a navigable preview to the user. The user system first selects a data set identification that identifies a data set for which a preview is to be made (act 401). This selection may be performed in response to a user selection, or it might be a default selection of the user system. The user system then obtains the sample of elements for that data set (act 402). For instance, the sample of elements for that data set might be local to the user system if the method 400 begins after act 314 in FIG. 3. Alternatively, the obtaining of the sample of elements for the data set (act 402) might be performed by the user system requesting (act 313 of FIG. 3) and receiving (act 314 of FIG. 4) the sample of elements for the requested data set. The user system then constructs the data set preview (act 403) using the sample of elements of the data set, and using the schema of the data set (e.g., the order and name of all of the columns in a table if the data set were a table). The user system then presents the data set preview to the user (act 404). Again, although the acts are described as being performed by the user system 210, all of the acts may be virtualized to be remotely located, except the act of displaying (act 404).

Figure 5:
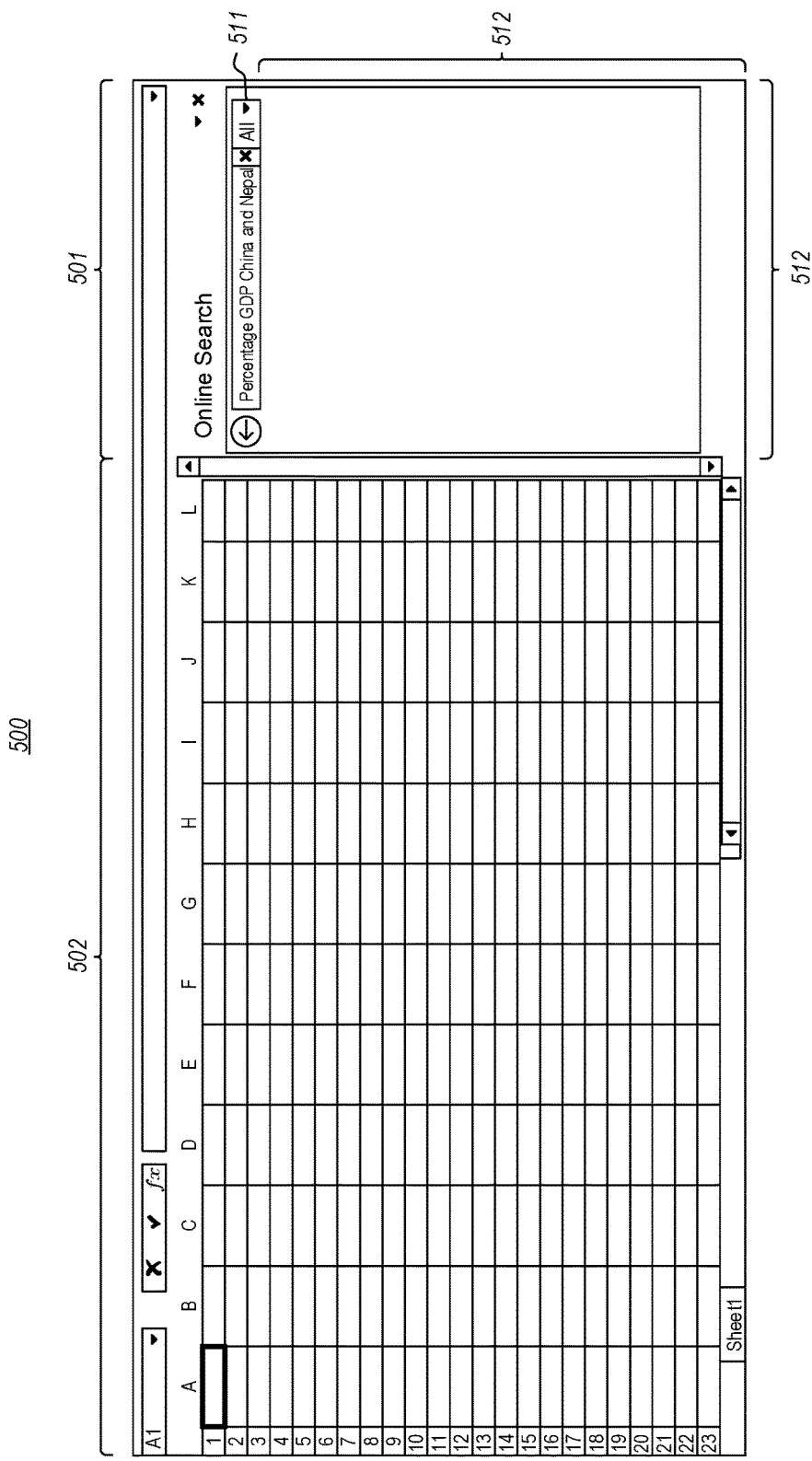
FIG. 5 illustrates a user interface that represents a beginning of a user experience that may more concretely illustrate the value of the user experience enabled by the principles described herein, and in which the user has entered a search query.

FIG. 5 illustrates a user interface 500 that represents a beginning of a user experience that may more concretely illustrate the value of the user experience enabled by the principles described herein. For instance, the user interface 500 may be displayed on a display of the user system 210. As an example, if the user system 210 were the computing system 100 of FIG. 1, the user interface 500 would be displayed on the display 112 of the computing system 100.

The user interface 500 includes a search administration area 501 and a search results area 502. In this case, the search results area 502 is in a familiar format that includes a grid of cells that may have associated expressions defining transformations. The search administration area 502 includes a query portion 511 and a data set identification portion 512. At this point, the data set identification portion 512 is not populated, but the user has entered a query in the query portion 511. In particular, the user has entered "Percentage GDP China and Nepal" apparently with an interest in comparing the gross domestic product of China and Nepal.

Upon submitting the query (e.g., by pressing enter), the user system would submit the query representing the text "Percentage GDP China and Nepal" to the search system. Of course, the user system might also perform some query processing such that this exact text is not necessarily transmitted, and perhaps the query data is no longer in the form of any text at all. The method 300 would then be performed at least to act 312 (which allows the user system to access candidate set identifiers), and potentially also to act 314 (which allows the user system to access samples of elements associated with one or more of the candidate data sets).

Figure 6:
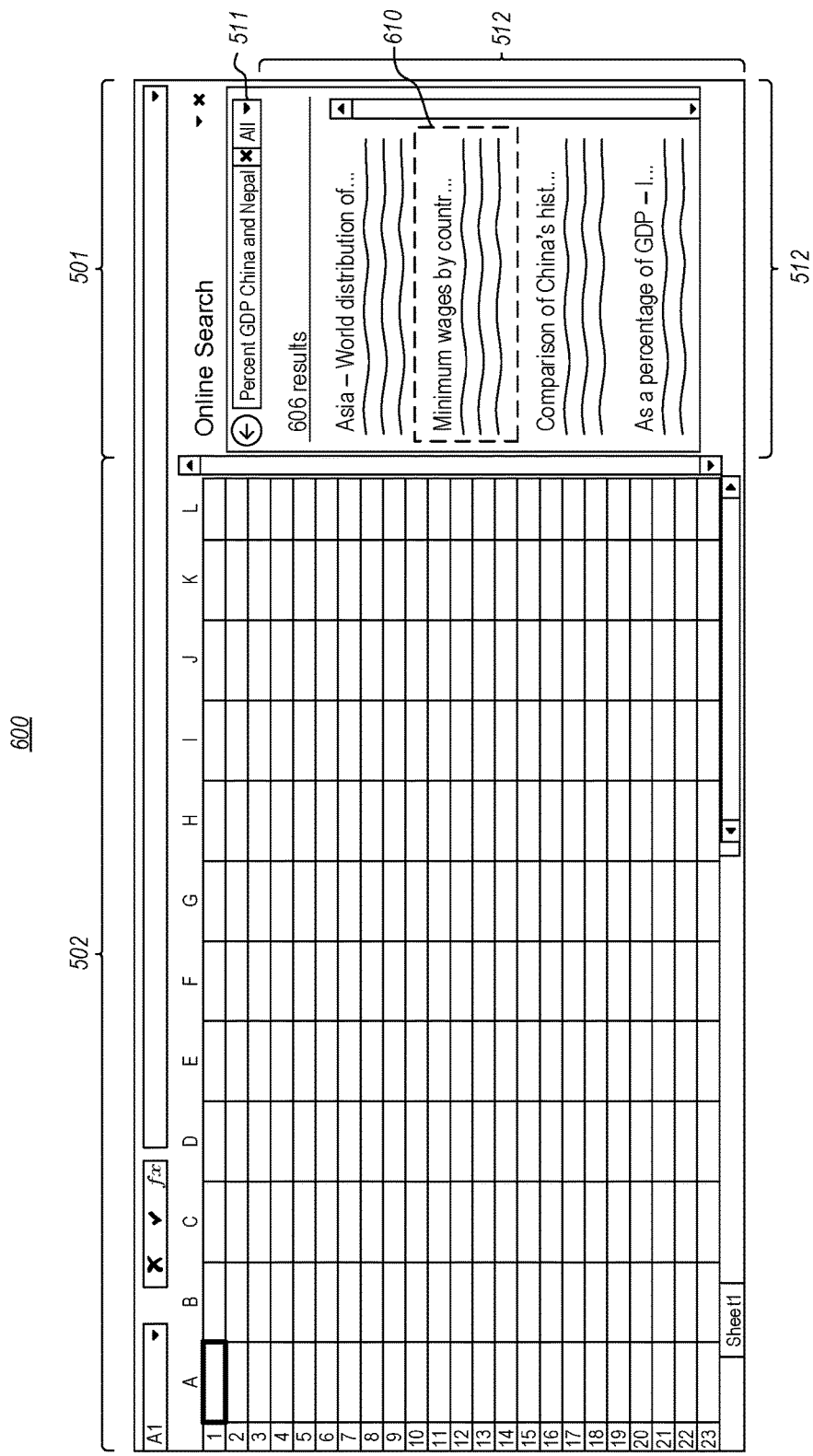
FIG. 6 illustrates a user interface that is similar to the user interface of FIG. 5, except that now the data set identification portion is filled with identifications of various data sets as a result of the user submitting the search query.

FIG. 6 illustrates a user interface 600 that is similar to the user interface 500 of FIG. 5, except that now the data set identification portion 512 is filled with identifications of various data sets. Such data sets may come from a wide variety of locations, whether local to the user system, or remotely located. In this case, the search system has returned over 600 data set identifications.

The user then selects one of the data set identification (e.g., data set identification 610) to obtain a preview of that data set. If the method 300 had been entirely performed for that data set, then the user system may then just access the sample of elements of the data set from the local user system. If the method 300 had been performed up to act 312, then the remainder of the method 300 would be performed, to thereby provide the sample of elements for the corresponding selected data set. The user system then uses the sample of elements to construct and present the navigable preview for the data set.

Figure 7:
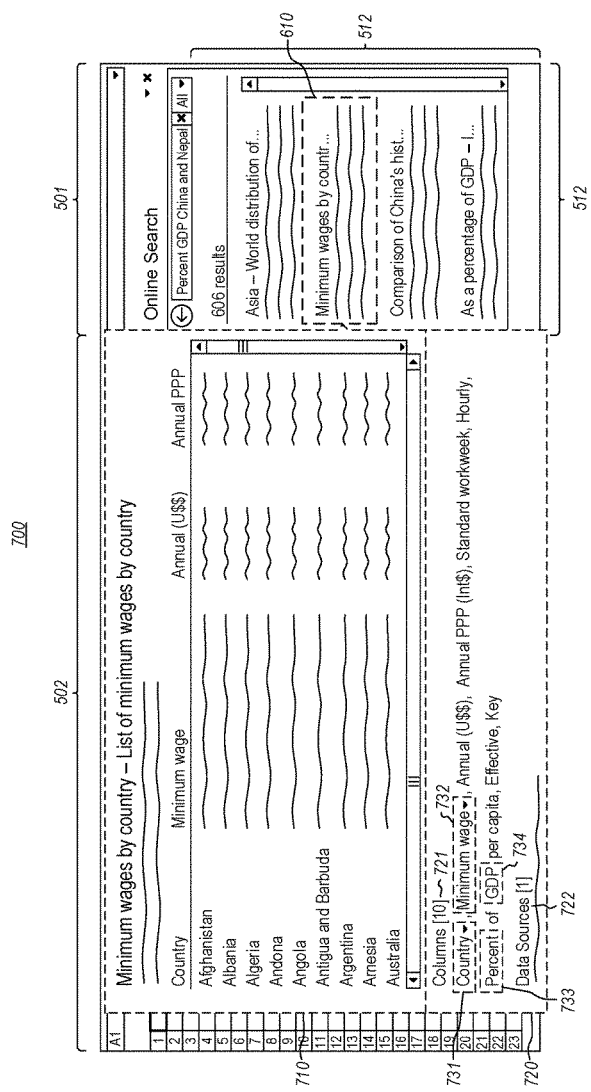
FIG. 7 illustrates a user interface that is similar to the user interface of FIG. 6, except that the data set identification is now visually emphasized as selected, and the search results area is populated.

FIG. 7 illustrates a user interface 700 that is similar to the user interface 600 of FIG. 6, except that the data set identification 610 is now visually emphasized as selected, and the search results area 502 is populated. In particular, the search results area 502 now includes a navigable preview 710 of the data set identified by the data set identification, and includes a navigation control area 720 populated with controls to help the user navigate the preview 710 in intuitive ways that will be hereinafter described.

Figure 8:
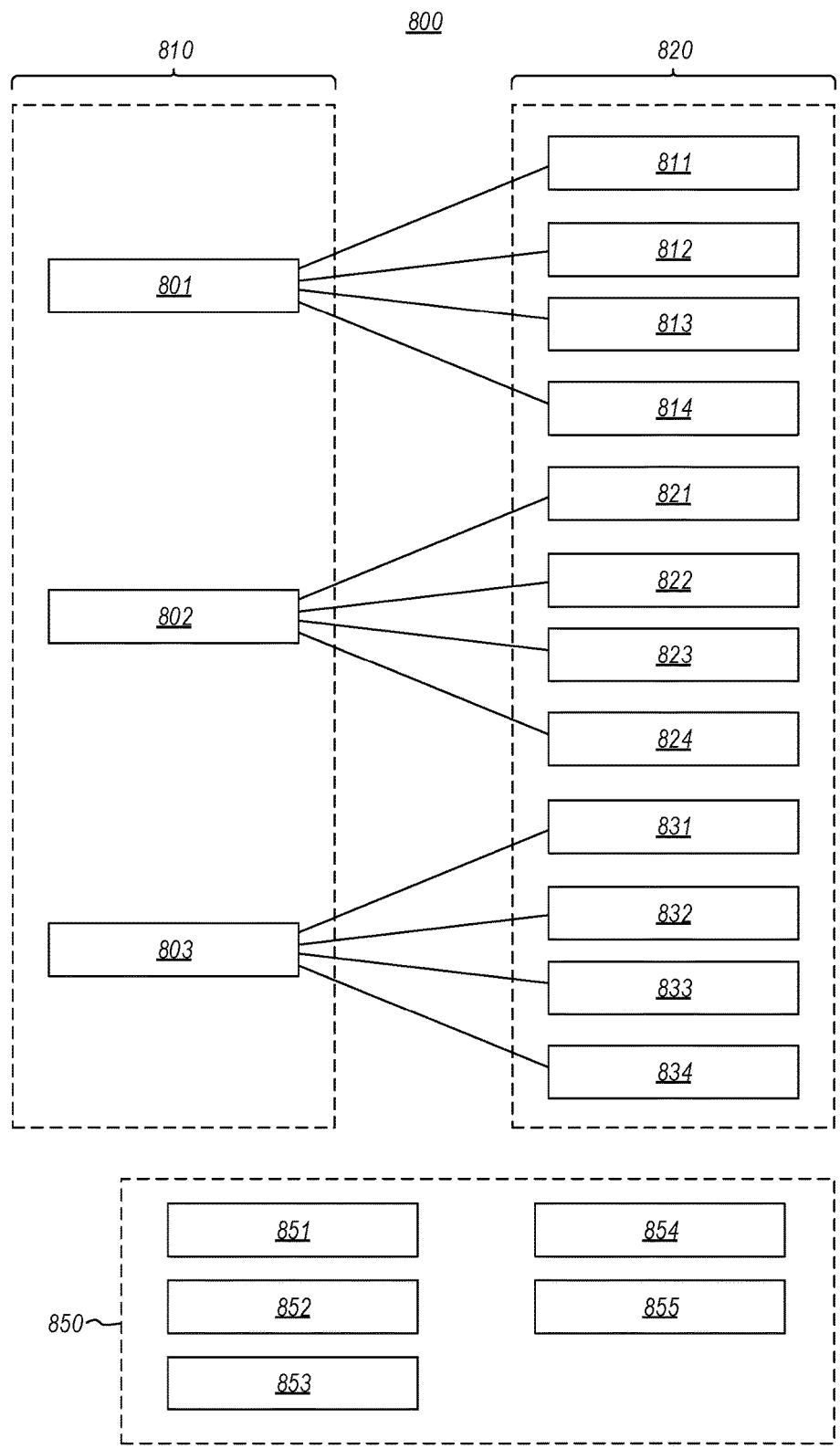
FIG. 8 illustrates an example sample of elements that might be extracted from a data set to facilitate construction of the view or preview of the data set.

First, however, a description of how the preview may be constructed using the sample of elements will now be described. FIG. 8 illustrates an example sample 800 of elements that might be extracted from a data set. As an example, if the data set were a table, the elements of the data set might be rows in the table. Thus, in that case, the sample 800 would include sample rows of the table.

The sample includes a first set 810 of samples for which there is a match on the query. In other words, one or more terms of the search query are included within the element (e.g., the row). In FIG. 8, for example, there are three elements 801, 802 and 803 (e.g., three rows) in which there was a hit on one or more terms of the search query.

The samples 800 also include a second set of samples that are proximate one or more of the first set of samples in the data set. For instance, as illustrated, there are four elements 811, 812, 813 and 814 that are selected based on proximity to the element 801 in the data set. There are also four elements 821, 822, 823 and 824 that are selected based on proximity to the element 402 in the data set. Likewise, there are also four elements 831, 832, 833 and 834 that are selected based on proximity to the element 803 in the data set. For instance, in the case of elements being rows, the first set of elements might be rows of the data set for which there is a hit on a search term, the second set of elements might be rows that neighbor one or more of the first set of row. In one example, the elements 801 and 811 through 814 are neighboring contiguous elements (e.g., neighboring rows). In other embodiments, some or all of the elements of the data set might be filtered through to eliminate low value additional elements from being included in the sample of elements.

The sample 800 also includes a concentration of elements 850 from one end of the data set. For instance, the concentration of elements 850 includes elements 851 through 855. For instance, the concentration of elements 850 might be those elements that a user would expect to see when first viewing a data set. In the case of a table, that concentration of elements might be the first several rows of the data set. The concentration of elements might thus be the first several rows, which is what a user typically expects to see when first viewing a table.

For instance, in FIG. 7, the user is viewing a table that has a first column that lists names of countries alphabetically. Here, the first several rows of that alphabetical table is illustrated. Though the preview 710 initially contains no hits, the preview 710 still gives the user an idea for the density of the data, and the column types included within the data. For instance, the preview 710 may be created from the samples 800 using the knowledge of the column titles and order, and using the elements 850 (which might be the first rows in the table).

The navigation control area 720 includes quite helpful information for navigating the data set preview including the source 721 of the data set, as well as the column titles 722 in order. In the case of the data set being a table, the columns represent portions of a data set. More generally speaking, the navigation control area may include controls for each of one or more of the data set portions (e.g., columns). In the illustrated table preview, there are several columns titled as follows from left to right 1) "Country", 2) "Minimum wage", 3) "Annual (US$)", 4) "Annual PPP (US$)", 5) "Standard workweek (hours)", 6) "Hourly (US$)", 7) "Percent of GDP per capita, 8) Effective, and 9) Key.

In the illustrated example, there are a number of visually emphasized areas 731 through 734 in the navigation controls area. This conveys information to the user regarding where hits on the search query were found in the data set. Recall that the original search is "percent GDP China and Nepal". Thus, there are four substantive search terms including "percent", "GDP", "China" and "Nepal". For instance there are two portions (columns) of the data set (table) that have values that are hits on the search query terms. That includes the "Country" column which is visually emphasized with emphasis 731, and the "Minimum Wage" column which is visually emphasized with emphasis 732. In this case, the visual emphasis demonstrating that the column contains a value that is a hit is represented by the entire column name being emphasized. The user might guess that the "Country" column includes hits for the search terms "China" and "Nepal".

However, in the illustrated example, there is also a column for which the title itself of the column of the table (more generally, the identifier of the portion of the data set) contains a hit. Specifically, consider the column title called "Percent of GDP per capita". Here the title itself includes a hit on the search term "percent" thus causing the "Percent" term in the column title to be visually emphasized with emphasis 733, and includes a hit on the search term "GDP" thus causing the "GDP" in the column title to be visually emphasized with emphasis 734. Thus, in the case of the portion identifier (e.g., the column title) including hits on the search terms, each of those hits might be independently visually emphasized in the navigation portion 720 that includes the portion identifier area 721.

In addition to this visual emphasis, the portion identifier area 721 includes a control for each data set portion (e.g., for each column). More specifically, the column title area 721 includes a control for each column. By selecting the control, the column itself in the preview 710 is visually emphasized, and, if out of the field of view, is automatically scrolled to be within view. A navigation experience will now be described with respect to FIGS. 9 through 13.

Figure 9:
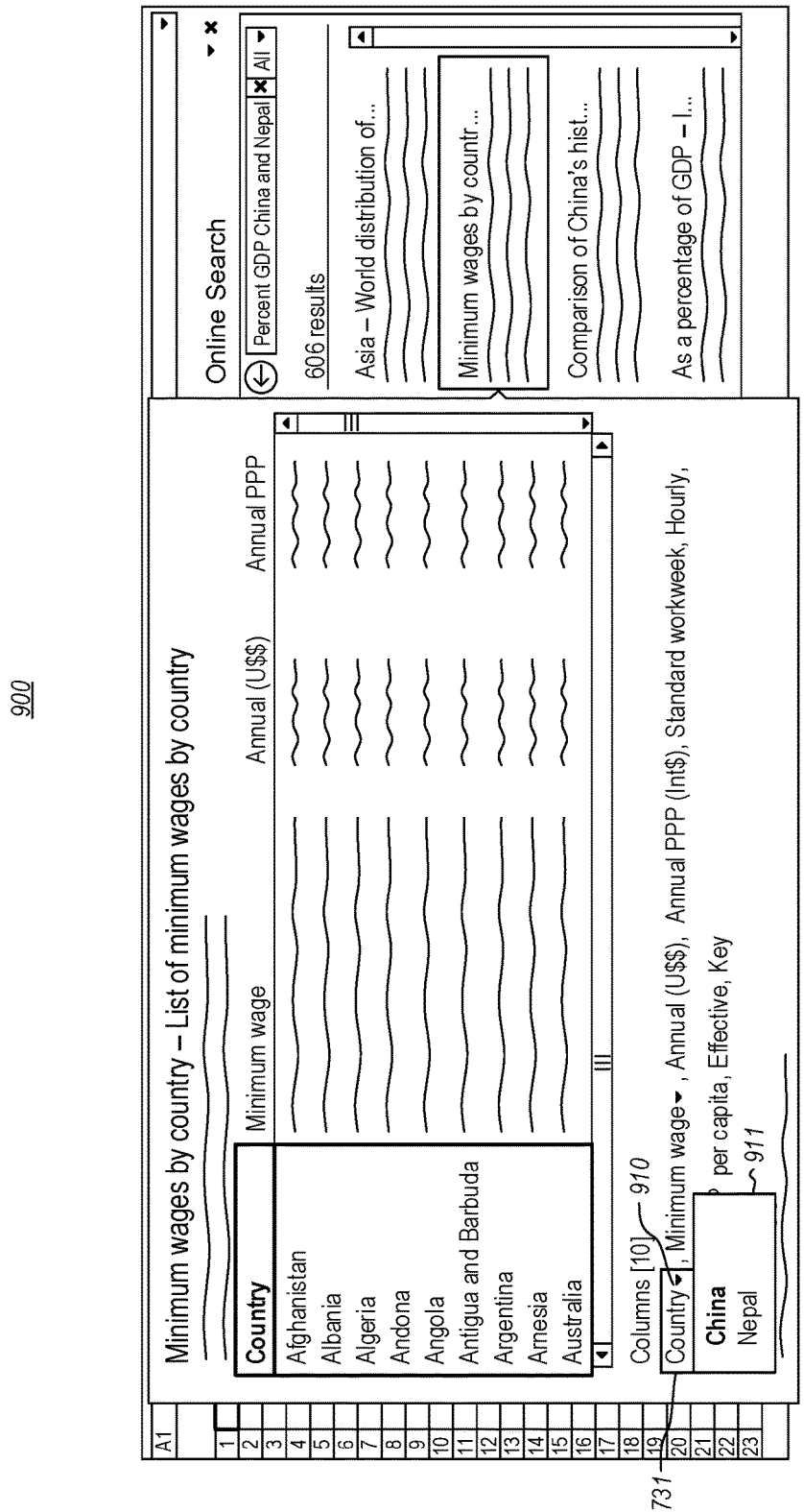
FIG. 9 illustrates a user interface that is similar to the user interface of FIG. 7, except that the user has interacted with the "Country" column, which has a drop down control that includes a list of the unique search term hits that were found in that column.

FIG. 9 illustrates a user interface 900 that is similar to the user interface 700 of FIG. 7, except that the user has interacted with the "Country" column that is visually emphasized 731, which has a drop down control 910 that includes a list 911 of the unique search term hits that were found in that column. In this case, the search terms "China" and "Nepal" were indeed found in the "Country" column, though the hits are not present in the field of view of the preview page. The user may now select one of the values to cause the corresponding row that has that value for that column to be in view. Also, when the user selected the drop down control 910, the corresponding column of the preview was visually emphasized in a manner that matches the visual emphasis of the "Country" control. Thus, this gives the user intuitive knowledge of which column in the preview corresponds to that control that is actively being controlled.

Figure 10:
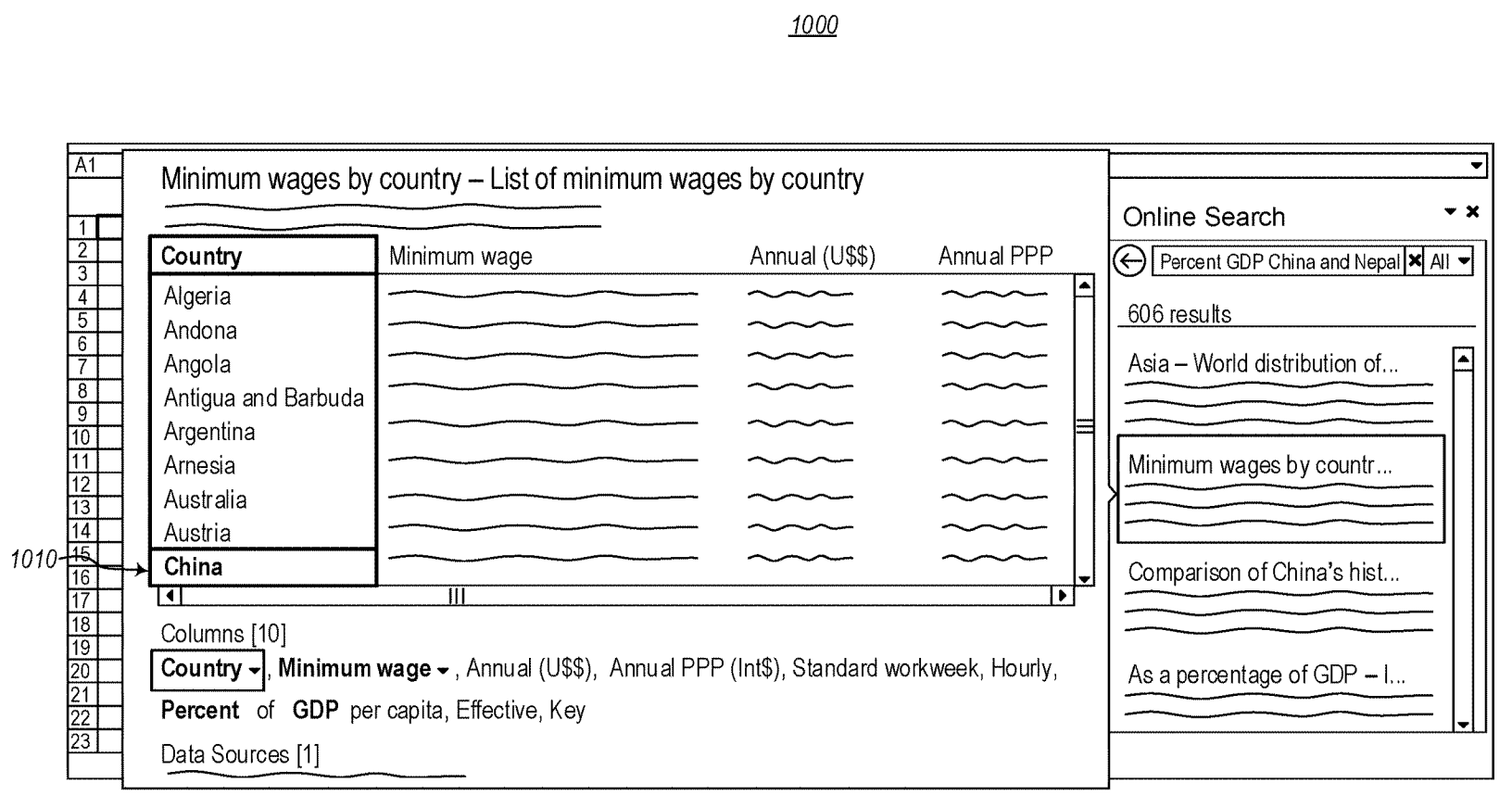

For instance, FIG. 10 illustrates a user interface 1000 that is similar to the user interface 900 of FIG. 9, except that the user has interacted with the "China" element from the drop down list 911, causing the China row 1010 to automatically be pulled into the field of view. Likewise, since China is a hit on the search term, the term "China" in the "Country" previous column is visually emphasized, and in such a way that the visual emphasis corresponds to the visual emphasis of the "Country" control. For instance, both visual emphases might have common features such as color.

Note that the "China" row 1010 does not really appear next to the other rows in the preview area in the actual data set itself. For instance, there are many countries that begin with the letter "B". However, by leaving a significant number of rows that are generally clustered more closely together (such as the "Algeria" through "Austria" rows), the user continues to be aware of the general density of data (along the rows dimension) within the table. Thus, the user is still apprised of the quality of the data in general while seeing specific data regarding China.

Figure 11:
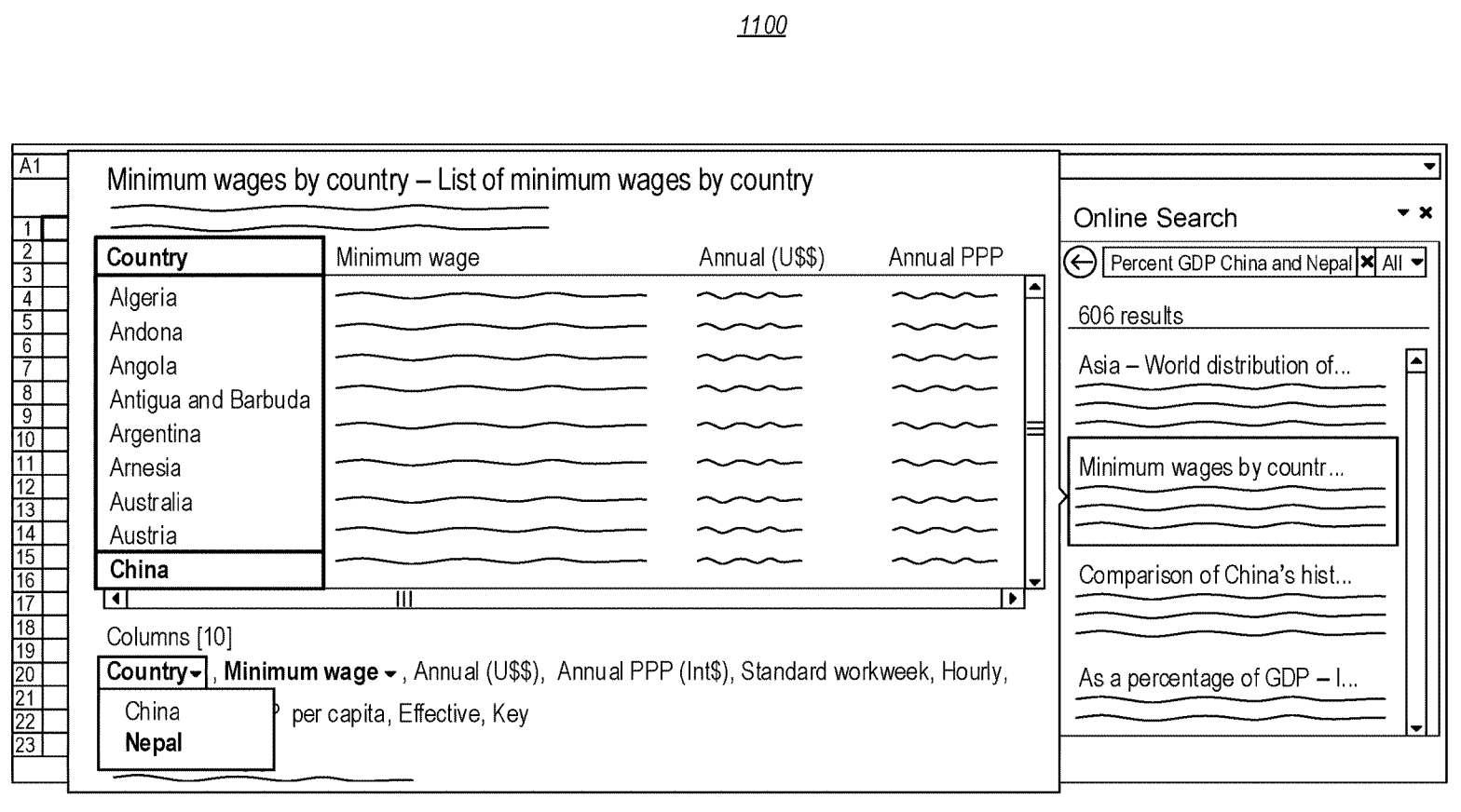
Figure 12:
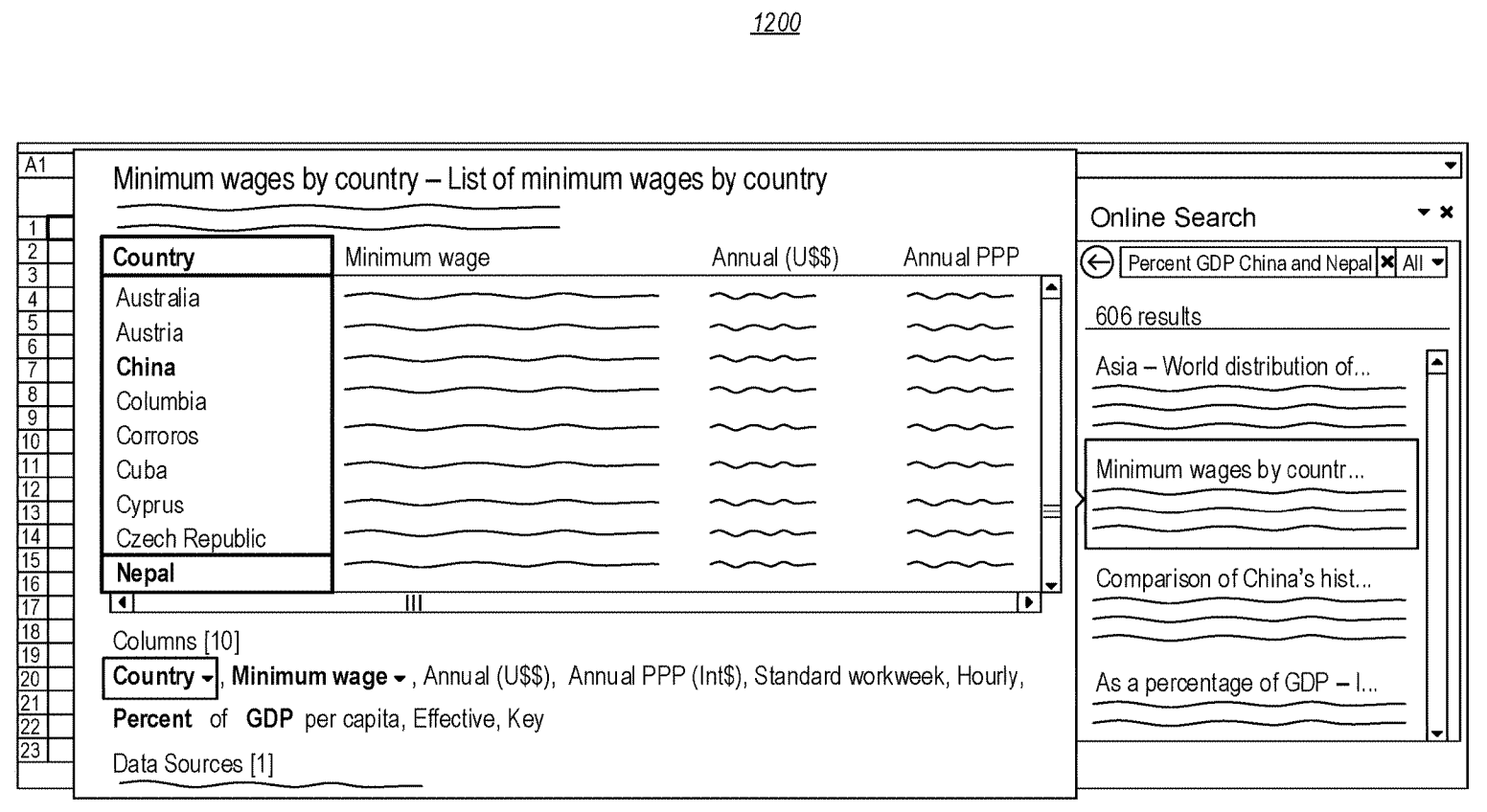

FIG. 11 illustrates a user interface 1100 that is similar to the user interface 1000 of FIG. 10, except now again the user selects the "Country" drop down control for the purpose of selecting "Nepal". FIG. 12 illustrates a user interface 1200 that results from the user selecting "Nepal" from the "Country" drop down control in FIG. 11. Now, the "Nepal" row (where "Nepal" appears as a value in the "Country" column) is also pulled into view. Note how several neighboring rows for the "China" row are also pulled into view. Thus, the user may see what is in the "China" row and what is in the "Nepal" row, while still maintaining an understanding of the general density of rows that would appear in the full data set if selected.

Note that in the experience from FIGS. 9 through 12, only a few rows of the data set were needed for the user to make the evaluation of the data quality and relevance of the data set. There might be thousands or millions of rows in the actual data set itself. Yet, in this example, only several dozen rows were used for the preview. Accordingly, the sample elements provided by the search system are carefully selected so that the samples may be few relative to the entirety of the data set, while still allowing the user to navigate the preview. For instance, in the case of FIGS. 9 through 12, the sample might just include the first 11 rows of the table, the two rows (the China row and the Nepal row) that have hits, and perhaps 5 neighboring rows each for each of the China row and the Nepal row. Thus, fewer than 25 rows of the table were extracted, while still giving an intuitive navigation experience to the user to allow the user to get a quick understanding of the completeness and relevance of the data set.

FIG. 13 illustrates a user interface 1300 that results from the user selecting the "percent GDP per capita" control. Note that the corresponding column appears quickly in the preview area through a scroll left or scroll right operation. The user was able to view the emphasis 733 on the search term "percent", and the emphasis on the search term "GDP" to get a pretty good idea that this column might include some interesting information relevant to the original search query. Accordingly, the user was able to quickly use that column control to bring that column into view.

Through navigation of the preview, if the user determines that the data set is of interest, the user might select the link within the data source 722 area of the navigation area 720 (see FIG. 7). That link remained through all of the user experience of FIGS. 9 through 13 also. If that data set is not what the user was hoping for, the user might instead pick another data set in the data set identification area 512, and perform similar navigation of the preview.

Thus, the principles described herein provide an effective mechanism to allow users to quickly evaluate data sets that result from a search, to determine whether or not various resulting data sets satisfy the interests of the user. Thus, the user may actively participate with automated processes and quickly mining for information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of presenting a preview of search results, comprising:
   obtaining a preview of a data set that matches a search query having one or more search terms, wherein obtaining the preview of the data set comprises:
      in a first display area of a user interface, presenting for selection identifications for a plurality of data sets selected in response to the search query; and
      in a second display area of the user interface, presenting a navigable preview of a data set corresponding to a selection of one of the identifications for the plurality of data sets, wherein the navigable preview of the data set comprises a table having columns and rows in which data of the previewed data set is presented;
   in a navigation control area of the user interface, visually emphasizing one or more portions of the table, wherein each visually emphasized portion of the table contains one or more hits for one or more search terms of the query;
   selecting one of the visually emphasized portions presented in the navigation control area; and
   in response to the selection, the navigable view being adjusted to present only rows or columns of the table which contain a hit for one of the search terms of the query.

2. The computer-implemented method in accordance with claim 1, wherein selection of a visually emphasized portion causes a list to appear of one or more search terms that are found in a row or column for the corresponding visually emphasized portion.

3. The computer-implemented method in accordance with claim 2, wherein adjusting the navigable view comprises, in addition to presenting only rows or columns of the table which contain a hit for one of the search terms of the query, the navigable view is further adjusted to present a given number of other rows or columns each containing a hit and selected based on proximity to the rows or columns presented when the navigable view was adjusted in response to the selection.

4. The computer-implemented method in accordance with claim 3, wherein further adjusting the navigable view comprises deleting one or more rows to present a given row containing a hit and the given number of other rows is selected based on proximity to the given row containing the hit.

5. The computer-implemented method in accordance with claim 3, wherein further adjusting the navigable view comprises deleting one or more columns to present a given column containing a hit and the given number of other columns is selected based on proximity to the given column containing the hit.

6. The computer-implemented method in accordance with claim 2, wherein the navigable preview comprising the table having columns and rows is initially presented with a concentration of rows and columns sufficient to provide an indication of the nature of the data set contained by the table presented in the navigable preview.

7. The computer-implemented method in accordance with claim 2, wherein the one or more visually emphasized portions of the table are column headings.

8. A system comprising:
   one or more processors;
   a computer-readable media having thereon computer-executable instructions that are structured such that, when executed by one or more processors of a computing system, cause the computing system to perform a method of presenting a preview of search results, the method comprising:
      obtaining a preview of a data set that matches a search query having one or more search terms, wherein obtaining the preview of the data set comprises:
         in a first display area of a user interface, presenting for selection identifications for a plurality of data sets selected in response to the search query; and
         in a second display area of the user interface, presenting a navigable preview of a data set corresponding to a selection of one of the identifications for the plurality of data sets, wherein the navigable preview of the data set comprises a table having columns and rows in which data of the previewed data set is presented;
      in a navigation control area of the user interface, visually emphasizing one or more portions of the table, wherein each visually emphasized portion of the table contains one or more hits for one or more search terms of the query;
      selecting one the visually emphasized portions presented in the navigation control area; and
      in response to the selection, the navigable view being adjusted to present only rows or columns of the table which contains a hit for one of the search terms of the query.

9. The system in accordance with claim 8, wherein the plurality of data sets are each dimensional data sets comprising a table with rows and columns in which the data is presented, and wherein obtaining the preview of a data set that matches a search query further comprises:
   for one or more data sets, extracting samples of sub-dimensional elements comprised or rows or columns from the dimensional data set, the samples of sub-dimensional elements including a first set of samples of sub-dimensional elements which contain a hit for one or more terms of the search query, and a second set of samples of sub-dimensional elements that are proximate to at least one the first set of samples of sub-dimensional elements.

10. The system in accordance with claim 9, wherein the extracted samples are ranked.

11. The system in accordance with claim 9, wherein the extracted samples are not extracted until a request is received to extract the samples for a given selection of an identification of one of the plurality of data sets.

12. The system in accordance with claim 9, wherein the extracted samples are contained in the navigable preview presented in response to selection of one of the identifications for one of the plurality of data sets.

13. The system in accordance with claim 8, wherein selection of a visually emphasized portion causes a list to appear of one or more search terms that are found in a row or column for the corresponding visually emphasized portion.

14. The system in accordance with claim 8, wherein adjusting the navigable view comprises, in addition to presenting only rows or columns of the table which contain a hit for one of the search terms of the query, the navigable view is further adjusted to also present a given number of other rows or columns selected based on proximity to the rows or columns presented when the navigable view was adjusted in response to the selection.

15. The system in accordance with claim 14, wherein further adjusting the navigable view comprises deleting one or more rows to present a row containing a hit and the given number of other rows is selected based on proximity to the row containing the hit.

16. The system in accordance with claim 14, wherein further adjusting the navigable view comprises deleting one or more columns to present a column containing a hit and the given number of other columns is selected based on proximity to the column containing the hit.

17. The system in accordance with claim 8, wherein the navigable preview comprising the table having columns and rows is initially presented with a concentration of rows and columns sufficient to provide an indication of the nature of the data set contained by the table presented in the navigable preview.

18. The system in accordance with claim 8, wherein the one or more visually emphasized portions of the table are column headings.

19. A computer-implemented method of presenting a preview of search results comprising:
  obtaining a preview of a data set that matches a search query having one or more search terms, wherein obtaining the preview of the data set comprises:
    in a first display area of a user interface, presenting for selection identifications for a plurality of data sets selected in response to the search query; and
    in a second display area of the user interface, presenting a navigable preview of a data set corresponding to a selection of one of the identifications for the plurality of data sets, wherein the navigable preview of the data set comprises a table having columns and rows in which data of the previewed data set is presented, and wherein only those rows and columns presented in the navigable preview are rows and columns that contain one or more hits for the one or more search terms;
  in a navigation control area of the user interface, visually emphasizing one or more portions of the table, wherein each visually emphasized portion of the table contains one or more hits for one or more search terms of the query;
  selecting for presentation with the navigable view one the visually emphasized portions presented in the navigation control area; and
  in response to the selection, the navigable view being adjusted to include at least one additional row or column based on the emphasized portion selected for presentation.

20. The computer-implemented method in accordance with claim 19, wherein the plurality of data sets are each dimensional data sets comprising a table with rows and columns in which the data is presented, and wherein obtaining the preview of a data set that matches a search query further comprises:
  for one or more data sets, extracting samples of sub-dimensional elements comprised or rows or columns from the dimensional data set, the samples of sub-dimensional elements including a first set of samples of sub-dimensional elements which contain a hit for one or more terms of the search query, and a second set of samples of sub-dimensional elements that are proximate to at least one the first set of samples of sub-dimensional elements.

21. The computer-implemented method in accordance with claim 20, wherein the extracted samples are ranked.

22. The computer-implemented method in accordance with claim 20, wherein the extracted samples are not extracted until a request is received to extract the samples for a given selection of an identification of one of the plurality of data sets.

23. The computer-implemented method in accordance with claim 20, wherein the extracted samples are contained in the navigable preview presented in response to selection of one of the identifications for one of the plurality of data sets.

24. The computer-implemented method in accordance with claim 19, wherein selection of a visually emphasized portion causes a list to appear of one or more search terms that are found in a row or column for the corresponding visually emphasized portion.

25. The computer-implemented method in accordance with claim 19, wherein adjusting the navigable view comprises, in addition to presenting only those rows or columns of the table which contains a hit for one of the search terms of the query, the navigable view is further adjusted to present a given number of rows or columns selected based on proximity to a given row or column which contains a hit.

26. The computer-implemented method in accordance with claim 25, wherein further adjusting the navigable view comprises deleting one or more rows to present a given row containing the hit and the given number of rows selected is based on proximity to the given row containing the hit.

27. The computer-implemented method in accordance with claim 25, wherein further adjusting the navigable view comprises deleting one or more columns to present a given column containing the hit and the given number of rows is selected based on proximity to the given column containing the hit.

28. The computer-implemented method in accordance with claim 19, wherein the navigable preview comprising the table having columns and rows is initially presented with a concentration of rows and columns sufficient to provide an indication of the nature of the data set contained by the table presented in the navigable preview.

29. The computer-implemented method in accordance with claim 19, wherein the one or more visually emphasized portions of the table are column headings.

* * * * *